Patented May 26, 1925.

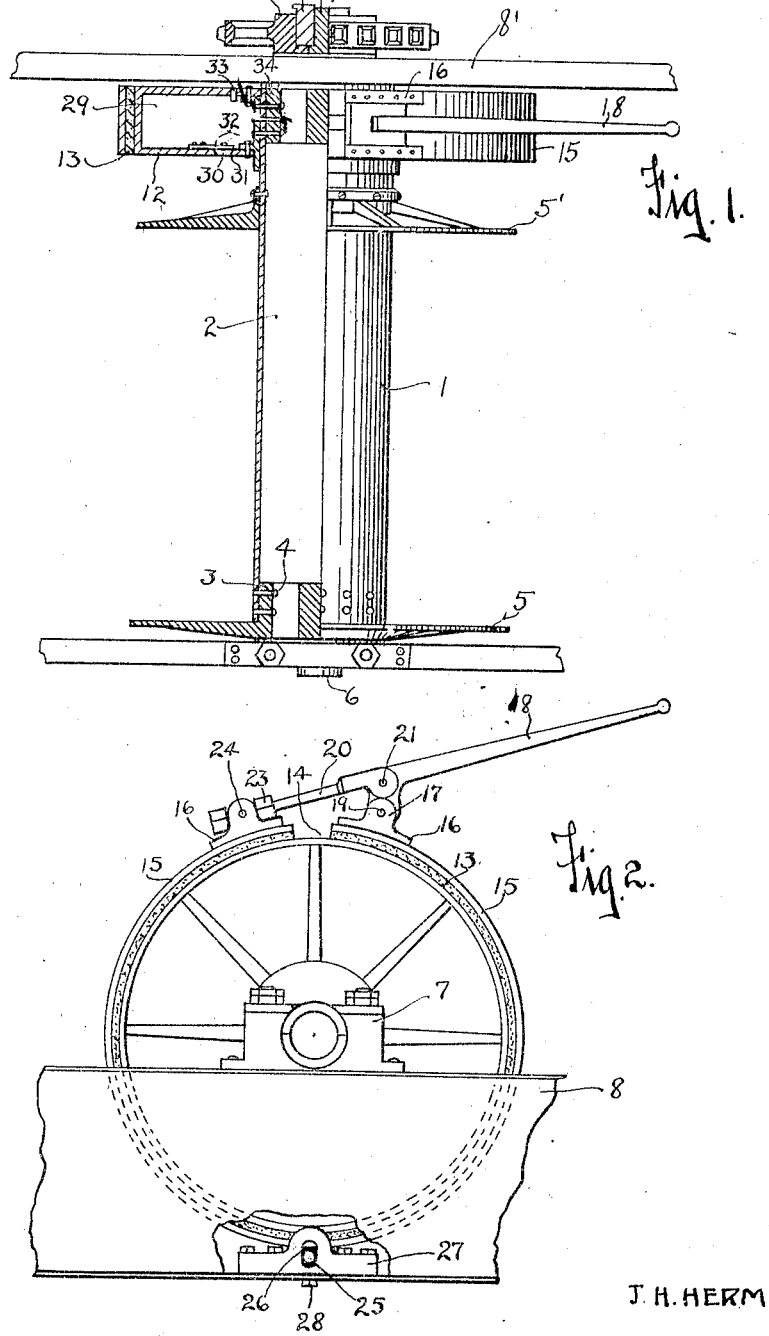

1,539,391

UNITED STATES PATENT OFFICE.

JOHN H. HERMAN, OF LOS ANGELES, CALIFORNIA.

HOISTING DRUM.

Original application filed June 13, 1921, Serial No. 477,292. Divided and this application filed May 1, 1922. Serial No. 557,741.

*To all whom it may concern:*

Be it known that I, JOHN H. HERMAN, a citizen of the United States, residing at Los Angeles, Los Angeles County, California, have invented a certain new and useful Improvement in Hoisting Drums, of which the following is a full, clear, and exact description, such as will enable others skilled in the art to which it appertains to make and use the same.

My invention relates to an improvement in hoisting drums for the purpose of reeling and unreeling cable, and while it has particular application to hoisting drums used in well drilling, it is obvious that it has a wide field of use and is applicable for other purposes. This invention comprises a division of my prior application, Serial Number 477,292, filed June 13th, 1921.

An object of my invention is to provide a hoisting drum having a brake drum and brake thereon and means of cooling the said brake drum during the operation thereof.

Another object is to provide a cooling system for such a brake drum wherein the cooling fluid may be renewed from time to time as desired.

Another object is to provide a means of supporting the brake band upon the drum whereby the most efficient operation thereof may be secured.

Referring to the drawing herewith wherein like numerals of reference are applied to like parts in both the views, Fig. 1 is a top plan view of a hoisting drum embodying my invention, one half of said drum being shown in central horizontal section.

Figure 2 is an end view of the said drum, certain parts being broken away to show the lower supporting means for the brake band.

In the drawing I have shown a brake drum 1 of ordinary construction comprising a central tubular portion 2. This tubular member has, in one end thereof, a hub 3 secured thereto by rivets 4 or other similar means. To this hub end is secured a laterally projecting plate or flange 5 forming a guide or stop for the cable to be reeled. Centrally of the hub 4 is an axial trunnion that is adapted to be supported within a bearing block 7. This block 7 is in turn supported upon an end beam 8 constituting the frame of the machine.

On the other end of the drum is a similar hub 34, having an outwardly projecting shaft 9 to which is keyed a sprocket wheel 10 by means of a key 11. This sprocket wheel furnishes a driving connection with some source of power. Spaced from the sprocket wheel, within the frame 8', in which the stub shaft is supported, is a second plate or flange 5' limiting the reeling portion of the drum.

Between this plate and the supporting beam 8' is secured a hollow brake drum 12. This drum is of the usual shape being a short cylinder, the outer surface of which furnishes a contact with a brake lining 13 extending around the lower drum, and the ends thereof spaced slightly apart at the upper end as shown at 14 in Fig. 2. Outside of this brake lining is a brake band 15. This brake band is made up of a hoop of resilient metal, such as steel, entirely surrounding the brake lining and so arranged as to force the said lining against the drum. To accomplish this, as shown particularly in Fig. 2, each end of the brake band has a plate 16 secured thereto and on this plate are upwardly extending lugs 17 spaced apart to provide an attachment for the brake lever This lever comprises a handle 18 bent at its forward end into the usual bell crank form, the short arm of which is pivoted at 21 to the bent portion of the lever 18 and is attached by adjustable means to the plate 16 This attachment comprises a threaded end on the link 20 to which are secured spaced nuts 22 and 23. Included between these two nuts upon the link is a transverse member pivoted at 24 to the upstanding lugs on the plate 16.

The lower side of the brake band has attached thereto a plate having a laterally extending pin 25. The two ends of the pin are adapted to fit within slots 26 in the plumber blocks 27. There may be two of these blocks secured upon the beam 8' and the pin 25 may be received at each end in one of these two blocks. A screw 28 is introduced through the support 8' and the lower end of the slot in the plumber block to contact with the pin 25 and support the same in adjusted vertical position. Thus when the brake band is loosened there would ordinarily be a tendency of the brake band to drop downwardly so that the lower half thereof would be out of contact with the lining. The adjusting of the set screw 28 will serve to prevent this movement and retain the brake band in operative position at all times.

The hollow brake drum includes a central chamber 29 for cooling fluid. A lateral opening or manhole 30 is formed in the side of the drum adjacent the hub. It is closed by a plug 31 held in position by means of a spring 32 on the inner side of the chamber. By means of this opening water or other cooling liquid may be introduced into the brake drum as desired. An opening 33 of small diameter is formed on the opposite wall of the chamber to form an outlet for steam which may be generated as the cooling liquid becomes heated.

In the operation of my device the drum may be rotated as desired and the cooling liquid within the drum will be thrown outwardly by centrifugal force against the inner surface of the drum, in such position as to cool the surface which becomes heated by friction due to the brake band. When the drum is at rest liquid will settle in the lower part of the chamber, but upon operation will immediately be thrown outwardly where it will be most effective. It will thus serve to keep the drum cool at the point where the cooling is required and can not come in contact with the brake lining and thus serve to reduce the effectiveness of the brake. A small quantity of cooling liquid in this system of cooling will last for long periods of time with no care on the part of the operator, and the safety of the device will be greatly increased due to the fact that the cooling liquid cannot effect the operation of the brake.

Having thus described my invention, what I claim as new and desire to protect by Letters Patent is:

1. In a hoisting drum, a hollow cylindrical brake drum, the interior of which forms a reservoir, a brake band on said drum, means to regulate the pressure on said brake band, and means to introduce a cooling fluid within said reservoir so as to partly fill the interior thereof, whereby the fluid will be thrown into contact with the inner surface of said drum when said drum rotates.

2. In a hoisting drum, a hollow cylindrical brake drum having a liquid chamber therein, a brake band on said drum, means to regulate the pressure of said brake band on said drum, said chamber having an automatically closing opening therein adjacent the center thereof.

3. In a hoisting drum, a hollow brake drum, a fluid chamber inside said drum, said chamber having a steam outlet and an automatically closing inlet port therein adjacent the center thereof, a brake band on said drum and means to regulate said brake band on said drum.

4. In a hoisting drum, a hollow cylindrical brake drum forming a reservoir, a brake band on said drum, and means of filling said reservoir with fluid, whereby said fluid will be applied to the inner surface of said drum out of contact with said brake band for cooling purposes.

In testimony whereof I hereunto affix my signature this the 14th day of April, A. D. 1922.

J. H. HERMAN.